United States Patent
Karampatsis et al.

(10) Patent No.: US 11,490,292 B2
(45) Date of Patent: Nov. 1, 2022

(54) TRANSFERRING A DATA CONNECTION TO A RADIO ACCESS NETWORK

(71) Applicants: Lenovo (Singapore) PTE. LTD., New Tech Park (SG); Dimitrios Karampatsis, Ruislip (GB); Apostolis Salkintzis, Athens (GR); Roozbeh Atarius, La Jolla, CA (US)

(72) Inventors: Dimitrios Karampatsis, Ruislip (GB); Apostolis Salkintzis, Athens (GR); Roozbeh Atarius, La Jolla, CA (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 17/262,883

(22) PCT Filed: Jul. 23, 2018

(86) PCT No.: PCT/EP2018/069869
§ 371 (c)(1),
(2) Date: Jan. 25, 2021

(87) PCT Pub. No.: WO2020/020428
PCT Pub. Date: Jan. 30, 2020

(65) Prior Publication Data
US 2021/0321304 A1   Oct. 14, 2021

(51) Int. Cl.
*H04W 4/00*     (2018.01)
*H04W 36/00*    (2009.01)
(Continued)

(52) U.S. Cl.
CPC ... *H04W 36/0016* (2013.01); *H04W 36/0027* (2013.01); *H04W 36/0066* (2013.01); *H04W 40/36* (2013.01); *H04W 60/04* (2013.01)

(58) Field of Classification Search
CPC ......... H04W 36/0011; H04W 36/0016; H04W 36/0022; H04W 36/0027; H04W 36/0066; H04W 40/34; H04W 40/36; H04W 60/04
See application file for complete search history.

(56) References Cited

U.S. PATENT DOCUMENTS

| | | |
|---|---|---|
| 2011/0176511 A1 | 7/2011 | Sayeedi |
| 2016/0219464 A1 | 7/2016 | Roeland et al. |
| (Continued) | | |

FOREIGN PATENT DOCUMENTS

| | | |
|---|---|---|
| EP | 2925056 A2 | 9/2015 |
| WO | 2013153253 A1 | 10/2013 |
| WO | 2014070768 A1 | 5/2014 |

OTHER PUBLICATIONS

PCT/EP2018/069869, "Notification of Transmittal of the International Search Report and the Written Opinion of the International Searching Authority, or the Declaration", PCT ISA, dated Feb. 15, 2019, pp. 1-24.

(Continued)

*Primary Examiner* — Matthew W Genack
(74) *Attorney, Agent, or Firm* — Kunzler Bean & Adamson (57) ABSTRACT

Apparatuses, methods, and systems are disclosed for transferring a data connection to a radio access network. One method includes receiving, at a remote unit, an indication to handover from a first radio access network to a second radio access network. The method includes determining, after receiving the indication, that at least one data connection of the remote unit is unable to be transferred to the second radio access network. The method includes determining that the at least one data connection of the remote unit is able to be transferred to a third radio access network within a first time duration. The method includes transmitting, within the first (Continued)

time duration, a data connection request to reestablish the at least one data connection over the third radio access network.

18 Claims, 7 Drawing Sheets

(51) Int. Cl.
*H04W 40/36* (2009.01)
*H04W 60/04* (2009.01)

(56) References Cited

U.S. PATENT DOCUMENTS

2017/0034745 A1* 2/2017 Dhanapal .............. H04W 48/12
2018/0124641 A1 5/2018 Salkintzis
2019/0394279 A1* 12/2019 Dao ...................... H04W 48/04

OTHER PUBLICATIONS

Ericsson et al., "EPS Fallback for voice", 3GPP TSG-SA WG2 Meeting #126 S2-181637, Feb. 26-Mar. 2, 2018, pp. 1-10.
3GPP, "3rd Generation Partnership Project; Technical Specification Group Services and System Aspects; Single Radio Voice Call Continuity (SRVCC); Stage 2 (Release 15)", 3GPP TS 23.216 V15.2.0, Jun. 2018, pp. 1-69.
NTT Docomo, Intel, "TS 23.502: Nx-based Handover procedure", SA WG2 Meeting #119 S2-171590, Feb. 13-17, 2017, pp. 1-4.

* cited by examiner

TRANSFERRING A DATA CONNECTION TO A RADIO ACCESS NETWORK

FIELD

The subject matter disclosed herein relates generally to wireless communications and more particularly relates to transferring a data connection to a radio access network.

BACKGROUND

The following abbreviations are herewith defined, at least some of which are referred to within the following description: Third Generation Partnership Project ("3GPP"), Positive-Acknowledgment ("ACK"), Access and Mobility Management Function ("AMF"), Access Network ("AN"), Application Function ("AF"), Application Programming Interface ("API"), Access Point Name ("APN"), Aggregate MBR ("AMBR"), Application Server ("AS"), Connection Management ("CM"), Core Network ("CN"), Communication Pattern ("CP"), Control Plane/User Plane ("CP/UP"), Circuit Switched ("CS"), Discontinuous Reception ("DRX"), Downlink ("DL"), Data Network Access Identifier ("DNAI"), Data Network ("DN"), Data Network Name ("DNN"), Domain Name System ("DNS"), Exchanged Data Rates for GSM Evolution ("EDGE"), Enhanced Discontinuous Reception ("eDRX"), Enhanced Mobile Broadband ("eMBB"), Evolved Node B ("eNB"), Evolved Packet System ("EPS"), Evolved UTRA ("E-UTRA"), Evolved UTRAN ("E-UTRAN"), GSM EDGE Radio Access Network ("GERAN"), General Packet Radio Service ("GPRS"), Generic Public Subscription Identifier ("GPSI"), Global System for Mobiles ("GSM"), Home Public Land Mobile Network ("HPLMN"), Home Subscriber Server ("HSS"), Identity or Identifier or Identification ("ID"), IP Multimedia Subsystem ("IMS"), International Mobile Subscriber Identity ("IMSI"), Internet-of-Things ("IoT"), Internet Protocol ("IP"), Long Term Evolution ("LTE"), Multiple Access ("MA"), Maximum Bit Rate ("MBR"), Modulation Coding Scheme ("MCS"), Mobile Country Code ("MCC"), Mobility Management ("MM"), Mobility Management Entity ("MME"), Mobile Network Code ("MNC"), Mobile Network Operator ("MNO"), Machine Type Communication ("MTC"), Master Information Block ("MIB"), Mobile Initiated Connection Only ("MICO"), Mobility Management ("MM"), Mobile Switching Center ("MSC"), Mobile Station International Subscriber Directory Number ("MSISDN"), Non-3GPP Interworking Functions ("N3IWF"), Non-Access Stratum ("NAS"), Narrowband ("NB"), North Bound Interface ("NBI"), Network Parameter Configuration ("NC"), Negative-Acknowledgment ("NACK") or ("NAK"), Network Exposure Function ("NEF"), Next Generation ("NG"), Next Generation Node B ("gNB"), Policy Control Function ("PCF"), Protocol Data Unit ("PDU"), PDN Gateway ("PGW"), Public Land Mobile Network ("PLMN"), Packet Switched ("PS"), Power Saving Mode ("PSM"), Pointer ("PTR"), Quality of Service ("QoS"), QoS Flow Identifiers ("QFIs"), Radio Resource Control ("RRC"), Radio Access Network ("RAN"), Radio Access Technology ("RAT"), Receive ("RX"), Single Carrier Frequency Division Multiple Access ("SC-FDMA"), Service Capability Exposure Function ("SCEF"), Service Capability Servers ("SCS"), Serving GPRS Support Node ("SGSN"), Service Level Agreement ("SLA"), Subscriber Management ("SM"), Subscriber Management Function ("SMF"), Single Network Slice Selection Assistance Information ("S-NSSAI"), Subscriber Identity Module ("SIM"), System Information Block ("SIB"), Short Message Service ("SMS"), Signaling Radio Bearers ("SRBs"), Single Radio Voice Call Continuity ("SRVCC"), Session and Service Continuity ("SSC"), Subscription Concealed Identifier ("SUCI"), Subscription Permanent Identifier ("SUPI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Universal Terrestrial Radio Access ("UTRA"), Universal Terrestrial Radio Access Network ("UTRAN"), Visited Public Land Mobile Network ("VPLMN"), WiFi Local Area Network ("WLAN").

In certain wireless communications networks, a data connection may not be able to be transferred to a radio access network. In such networks, the data connection may not be usable if not transferred.

BRIEF SUMMARY

Methods for transferring a data connection to a radio access network are disclosed. Apparatuses and systems also perform the functions of the apparatus. In one embodiment, the method includes receiving, at a remote unit, an indication to handover from a first radio access network to a second radio access network. In various embodiments, the method includes determining, after receiving the indication, that at least one data connection of the remote unit is unable to be transferred to the second radio access network. In certain embodiments, the method includes determining that the at least one data connection of the remote unit is able to be transferred to a third radio access network within a first time duration. In some embodiments, the method includes transmitting, within the first time duration, a data connection request to reestablish the at least one data connection over the third radio access network.

An apparatus for transferring a data connection to a radio access network, in one embodiment, includes a receiver that receives an indication to handover from a first radio access network to a second radio access network. In various embodiments, the apparatus includes a processor that: determines, after receiving the indication, that at least one data connection of the apparatus is unable to be transferred to the second radio access network; and determines that the at least one data connection of the apparatus is able to be transferred to a third radio access network within a first time duration. In certain embodiments, the apparatus includes a transmitter that transmits, within the first time duration, a data connection request to reestablish the at least one data connection over the third radio access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
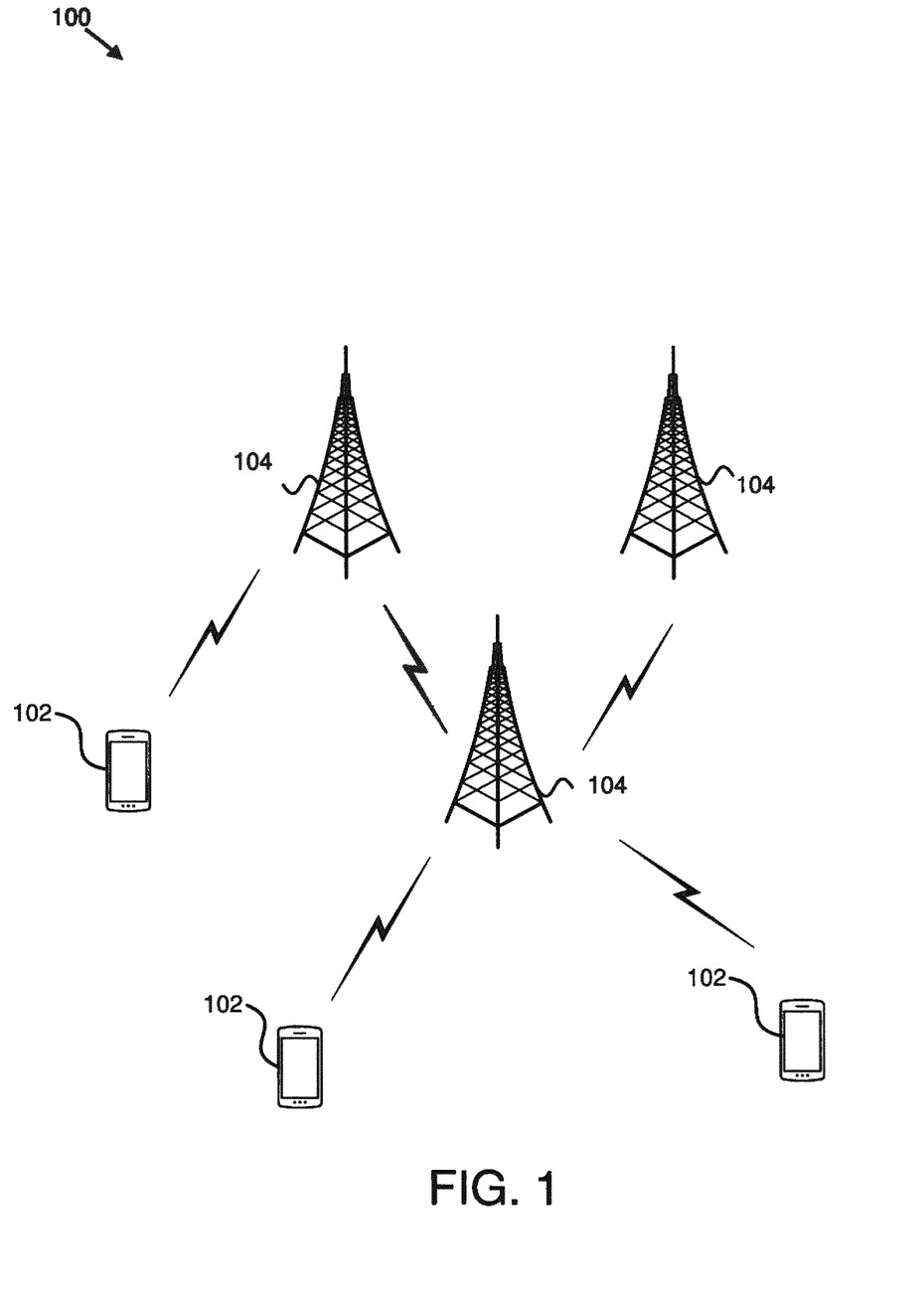
FIG. 1 is a schematic block diagram illustrating one embodiment of a wireless communication system for transferring a data connection to a radio access network.

FIG. 1 depicts an embodiment of a wireless communication system 100 for transferring a data connection to a radio access network. In one embodiment, the wireless communication system 100 includes remote units 102, and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components a gNB, a NG-RAN node, a RAN node, a core network, an MME, an HSS, an SCEF, an AMF, an SMF, an NEF, a DB, a PCF, a UDR, a UPF, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a network device, an indication from a first radio access network indicating that handover of a remote unit 102 to a second radio access network is complete. In certain embodiments, the network unit 104 may determine, after receiving the indication, that at least one data connection of the remote unit 102 is unable to be transferred to the second radio access network. In some embodiments, the network unit 104 may determine to suspend operation of the at least one data connection for a period of time until the at least one data connection is transferred to a third radio access network. Accordingly, a network unit 104 may be used for transferring, a data connection to a radio access network.

In certain embodiments, a remote unit 102 may transfer a data connection to a radio access network. In various embodiments, the remote unit 102 may receive an indication to handover from a first radio access network to a second radio access network. In certain embodiments, the remote unit 102 may determine, after receiving the indication, that at least one data connection of the remote unit 102 is unable to be transferred to the second radio access network. In some embodiments, the remote unit 102 may that the at least one data connection of the remote unit 102 is able to be transferred to a third radio access network within a first time duration. In various embodiments, the remote unit 102 may transmit, within the first time duration, a data connection request to reestablish the at least one data connection over the third radio access network. Accordingly, a remote unit 102 may be used for transferring a data connection to a radio access network.

Figure 2:
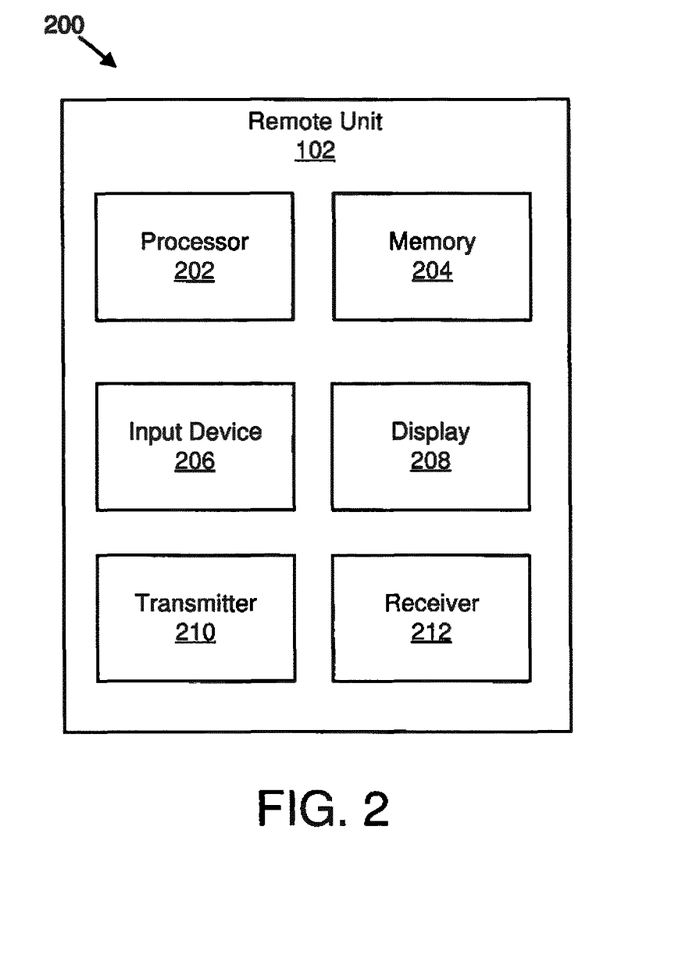
FIG. 2 is a schematic block diagram illustrating one embodiment of an apparatus that may be used for transferring a data connection to a radio access network.

FIG. 2 depicts one embodiment of an apparatus 200 that may be used for transferring a data connection to a radio access network. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: determine, after receiving an indication, that at least one data connection of the remote unit 102 is unable to be transferred to the second radio access network; and determine that the at least one data connection of the remote unit 102 is able to be transferred to a third radio access network within a first time duration. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime) In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may receive an indication to handover from a first radio access network to a second radio access network. In various embodiments, the transmitter 210 may transmit, within a first time duration, a data connection request to reestablish the at least one data connection over a third radio access network. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
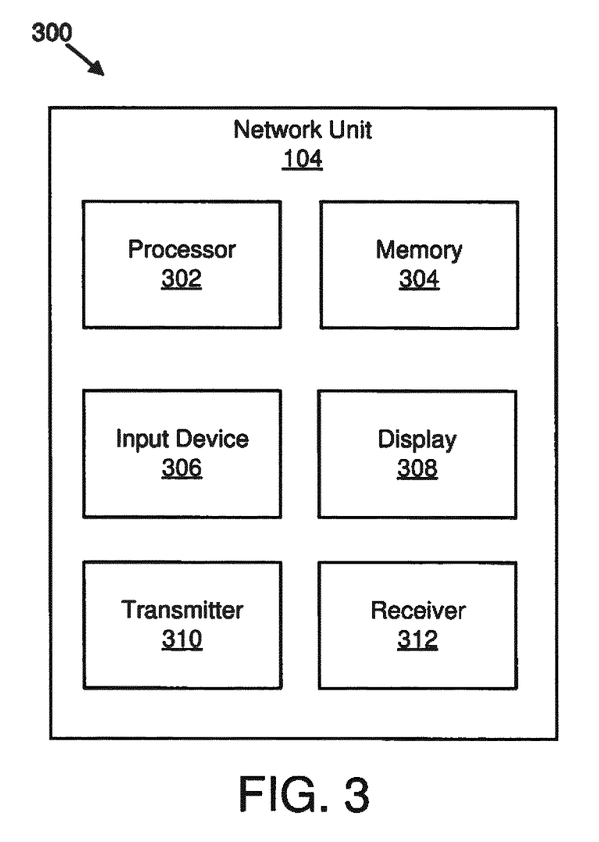
FIG. 3 is a schematic block diagram illustrating one embodiment of an apparatus that may be used for transferring a data connection to a radio access network.

FIG. 3 depicts one embodiment of an apparatus 300 that may be used for transferring a data connection to a radio access network. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives an indication from a first radio access network indicating that handover of a remote unit 102 to a second radio access network is complete. In various embodiments, the processor 302: determines, after receiving the indication, that at least one data connection of the remote unit 102 is unable to be transferred to the second radio access network; and determines to suspend operation of the at least one data connection for a period of time until the at least one data connection is transferred to a third radio access network.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

For inter-system handover between different networks some PDU sessions may not be transferred over to an EPS network due to: an SMF having no mapped QoS parameters for associated bearers sent via a PDU session; and the UE may not be able to transfer the bearers over the new network access.

As may be appreciated, 3GPP defines SRVCC for 5G UEs. In some embodiments, SRVCC may support voice only fallback to UTRA and PS handover may not be supported. SRVCC may support transition from E-UTRA to UTRA/GERAN and may be defined in 3GPP TS 23.216.

In various embodiments, a decision to trigger SRVCC may be done by a RAN node in response to the RAN determining that a remote unit 102 needs to handover to UTRA or GERAN and the remote unit 102 has an active voice session. In certain embodiments, in response to an MME receiving a handover request, the MME may support a bearer splitting function that determines which PS bearers are used for voice. In some embodiments, the PS sessions may not be handed over resulting in an AMF releasing the PDU sessions. This is shown in FIG. 4.

Figure 4:
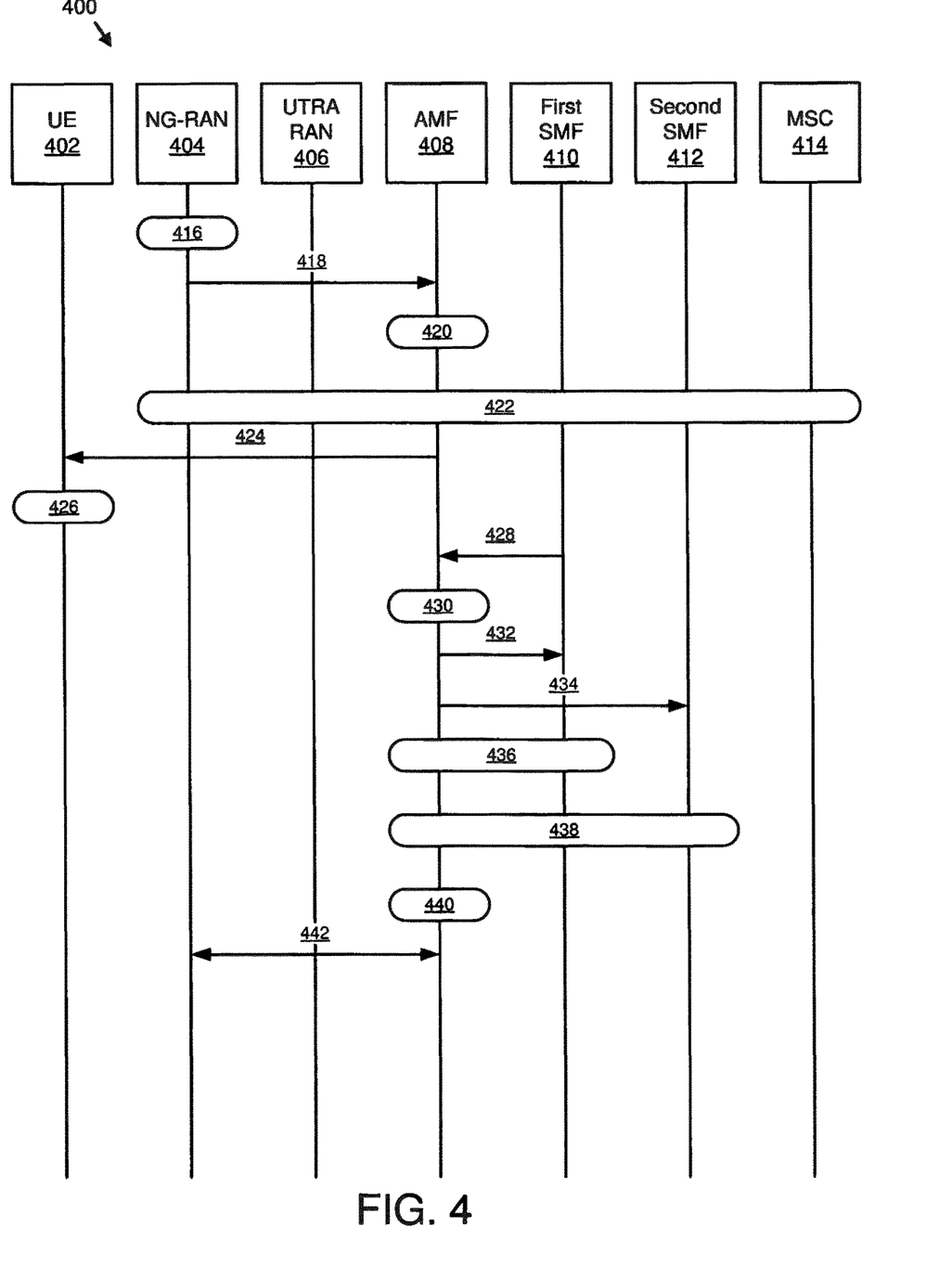
FIG. 4 illustrates one embodiment of communications of single radio voice call continuity handover without packet switching handover support.

FIG. 4 illustrates one embodiment of communications 400 of SRVCC handover without packet switching handover support. Specifically, communications 400 between a UE 402, an NG-RAN 404, an UTRA RAN 406, an AMF 408, a first SMF 410, a second SMF 412, and an MSC 414 are illustrated. As may be appreciated, any of the communications 400 described herein may be considered messages and/or parts of messages.

In certain embodiments, the NG-RAN 404 makes 416 an SRVCC decision. In some embodiments, a first communication 418 from the NG-RAN 404 to the AMF 408 may include a message indicating that an SRVCC handover is required. In various embodiments, the AMF 408 identifies 420 a voice bearer and initiates a CS handover.

In certain embodiments, handover preparation 422 and/or handover execution is performed among the NG-RAN 404, the UTRA RAN 406, the AMF 408, the first SMF 410, the second SMF 412, and/or the MSC 414. In a second communication 424 from the AMF 408 to the UE 402, the AMF 408 may send a handover command to the UE 402. In some embodiments, the UE 402 may deregister 426 locally from a 5G core network after the UE 402 camps in a UTRAN cell.

In various embodiments, a third communication 428 from the first SMF 410 to the AMF 408 may include the first SMF 410 forwarding a message indicating that relocation is complete. In certain embodiments, the AMF 408 may release 430 all PDU sessions on the 5G core network in response to handover being complete. In some embodiments, a fourth communication 432 from the AMF 408 to the first SMF 410 may include a PDU session release for a first DNN.

In various embodiments, a fifth communication 434 from the AMF 408 to the second SMF 412 may include a PDU session release from a second DNN. In certain embodiments, the first SMF 410 may release 436 the PDU session for the first DNN. In some embodiments, the second SMF 412 may release 438 the PDU session for the second DNN.

In various embodiments, the AMF 408 may deregister 440 the UE 402 without explicitly sending an N1 NAS message. In certain embodiments, a sixth communication 442 between the NG-RAN 404 and the AMF 408 may perform an N2 release.

During handover (SRVCC or normal 5G to EPS handover) some PDU sessions may be released thereby impacting user experience. If the UE 402 is also connected to a non-3GPP access while the UE 402 handovers to EPS or 3G the UE 402 could move all PDU sessions over to non-3GPP access ensuring that application that use each PDU session will not be interrupted.

In addition, because the AMF 408 knows the status of the UE 402 (i.e. registered over non-3GPP access) the AMF 408 may also determine, based on the status of the UE 402, whether the PDU sessions can be transferred to the non-3GPP access or suspended (or released).

In various embodiments, the procedure of handling PDU sessions may take into account situations in which the UE 402 is required to handover from a 5G access network to another access network, for example E-UTRA via EPS core or UTRA via 3G core. In embodiments for which there is 5G to EPS handover, the network may have a combination SMF+PGW-C node and a direct interface (e.g., N26 interface) between the AMF 408 and an MME that is used to enable the exchange of MM and SM states between a source and target network.

The combo SMF+PGW-C may have mapped EPS QoS parameters for each PDU session in the 5G core network. During handover the AMF 408 may provide to the MME the mapped EPS bearer context.

In response to the UE 402 receiving a handover command from the AMF 408 the UE 402 may correlate ongoing QoS flows with indicated EPS bearer IDs to be setup in the handover command. In some embodiments, the UE 402 may locally delete a PDU session if a QoS flow associated with a default QoS rule does not have an EPS bearer ID assigned. In embodiments in which there is a handover from 5G to UTRA due to SRVCC, handover of PS session may not be supported so the UE 402 may release all PDU sessions after handover is completed.

In certain embodiments, in response to the UE 402 being connected to a non-3GPP access network (e.g., via N3IWF) or being non-3GPP capable, the UE 402, instead of deleting such PDU session, could transfer the PDU sessions over to the non-3GPP access thus not interrupting any active applications that may impact user experience.

In certain embodiments, the UE 402 may decide to re-establish PDU sessions that cannot be transferred via non-3GPP access. In such embodiments, the UE 402 may request to establish the non-transferred PDU session IDs via the non-3GPP access.

In some embodiments, the AMF 408, after handover is completed, may identify PDU sessions that are not handed over to a target access network. If the AMF 408 is aware that the UE 402 is also registered via non-3GPP access or the UE 402 is non-3GPP capable, the AMF 408 may decide to deactivate or suspend such PDU sessions until the UE 402 reestablishes these PDU sessions via a non-3GPP access. Moreover, in certain embodiments, the AMF 408 may send a request to an SMF using a Nsmf_PDUSession_UpdateSMContext service operation to notify the SMF that the UP connection of some PDU sessions need to be deactivated or that the PDU session need to be suspended. In such embodiments, the SMF, on receiving such request may decide and indicate to the UPF handling the PDU session to deactivate the UP connection by releasing the N3 tunnel and may also indicate to the UPF to buffer downlink data.

In various embodiments, the AMF 408 may start a timer to manage PDU sessions. For example, when the timer expires and PDU sessions have not moved to non-3GPP access, the AMF 408 may release the PDU sessions and delete the UE 402 context. Such embodiments as discussed herein may be illustrated in FIG. 5.

Figure 5:
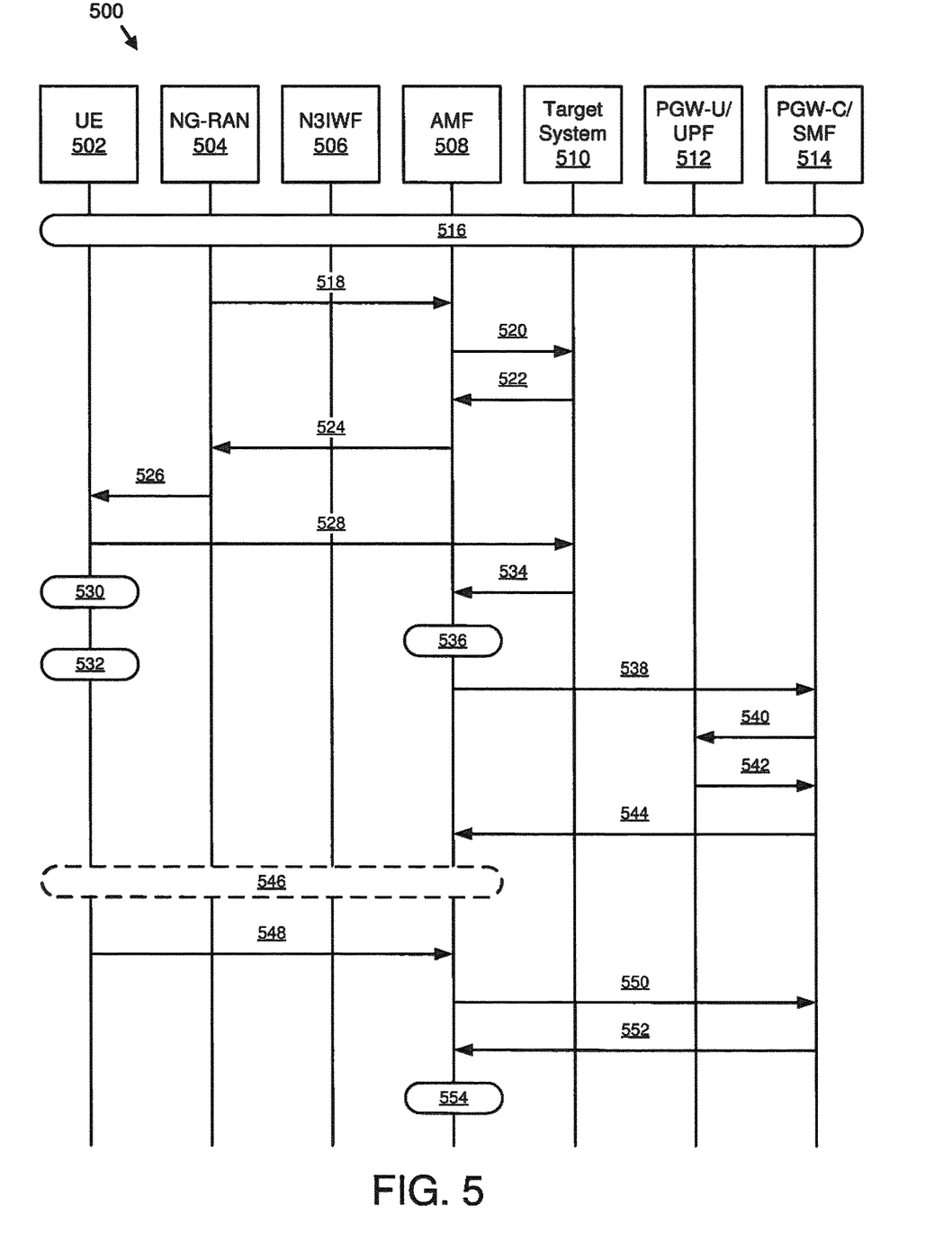
FIG. 5 illustrates one embodiment of communications of protocol data unit session transfer to non-third generation partnership project access during handover.

FIG. 5 illustrates one embodiment of communications 500 of protocol data unit session transfer to non-third generation partnership project access during handover. Specifically, communications 500 between a UE 502, an NG-RAN 504, a N3IWF 506, an AMF 508, a target system 510, a PGW-U/UPF 512, and a PGW-C/SMF 514 are illustrated. As may be appreciated, any of the communications 500 described herein may be considered messages and/or parts of messages.

In various embodiments, the UE 502 may have established 516 multiple PDU sessions (e.g., data connections) over the NG-RAN 504. For example, the UE 502 may have established 516 one PDU session for Internet and one PDU session for IMS.

In some embodiments, a first communication 518 from the NG-RAN 504 to the AMF 508 may include the NG-RAN 504 sending a handover required message to the AMF 508 indicating the target system (e.g., E-UTRAN+EPC or UTRAN+SGSN) in response to the NG-RAN 504 determining that the UE 502 must be handed over to EPS.

In certain embodiments, a second communication 520 from the AMF 508 to the target system 510 may include the AMF 508 sending a relocation request to the target system 510. Moreover, in various embodiments, a third communication 522 from the target system 510 to the AMF 508 may include the target system 510 sending a relocation response to the AMF 508.

In some embodiments, a fourth communication 524 from the AMF 508 to the NG-RAN 504 may include the AMF 508 starting the handover execution by sending a handover command to the UE 502 via the NG-RAN 504 in response to the handover preparation procedures being completed. The handover command may include information on the bearers that need to be handed over to the target system 510. In various embodiments, a fifth communication 526 from the NG-RAN 504 to the UE 502 may include the NG-RAN 504 sending the handover command to the UE 502.

In certain embodiments, a sixth communication 528 from the UE 502 to the target system 510 may include the UE 502 sending a handover complete message to the target system 510 indicating a successful handover indication.

In some embodiments, the UE 502 may determine 530 that: in response to the handover command being received, some PDU sessions cannot be transferred to the target system 510 (e.g., during handover to EPS the UE 502 checks that one or more QoS flows associated with a default QoS rule in a PDU session does not contain an EPS bearer ID); and/or after handover, the UE 502 cannot keep un-transferred PDU sessions over the NG-RAN 504 as the UE 502, for example, may not be able to support dual-registration.

In various embodiments, the UE 502 may decide 532, if the UE 502 is non-3GPP capable or already registered via non-3GPP access, to move the un-transferred PDU sessions via non-3GPP access.

In certain embodiments, potentially in parallel with the sixth communication 528 and the UE 502 determining 530 and deciding 532, in a seventh communication 534 from the target system 510 to the AMF 508 the target system 510 may notify the AMF 508 that handover is completed.

In some embodiments, the AMF 508 may detect 536 that not all PDU sessions were transferred (e.g., as there are still some PDU sessions active for the UE 502) and may start a timer to handle all the PDU sessions that were not transferred to the target system 510.

In various embodiments, in an eighth communication 538 from the AMF 508 to the PGW-C/SMF 514 the AMF 508 may send an Nsmf_PDUSession_UpdateSMContext request service operation message indicating to the PGW-C/SMF 514 to deactivate the UP or suspend the un-transferred PDU sessions by including the PDU sessions ID(s) of the un-transferred PDU sessions and an indication whether UP resources should be released or the PDU session should be suspended.

In certain embodiments, in a ninth communication 540 from the PGW-C/SMF 514 to the PGW-U/UPF 512, the PGW-C/SMF 514 may decide to release the UP resources and indicate to the PGW-U/UPF 512 to release the UP resources by releasing the N3 tunnel connection to a RAN node. The PGW-C/SMF 514 may also indicate to the PGW-U/UPF 512 to start buffering any downlink data sent to the UE 502 via a specific PDU session.

In some embodiments, in a tenth communication 542 from the PGW-U/UPF 512 to the PGW-C/SMF 514, the PGW-U/UPF 512 may send an N4 session modification response to the PGW-C/SMF 514 in response to the N4 session modification request received from the PGW-C/SMF 514.

In various embodiments, in an eleventh communication 544 from the PGW-C/SMF 514 to the AMF 508 the PGW-C/SMF 514 may send an Nsmf_PDUSession_UpdateSMContext response to the AMF 508 that acknowledges the request sent from the AMF 508.

In certain embodiments, if the UE 502 is non-3GPP capable and is not registered over non-3GPP access, the UE 502 selects 546 a WLAN access, if available, and performs registration via non-3GPP access.

In some embodiments, in a twelfth communication 548 from the UE 502 to the AMF 508, the UE 502 may check URSP rules and identify whether the PDU session can be transferred to non-3GPP. If the PDU session can be transferred, in the twelfth communication 548, the UE 502 sends a PDU session establishment request to the AMF 508 via non-3GPP access with all PDU session IDs that can be transferred to non-3GPP.

In various embodiments, in a thirteenth communication 550 from the AMF 508 to the PGW-C/SMF 514, the AMF 508 informs the PGW-C/SMF 514 that PDU sessions are transferred to non-3GPP invoking a Nsmf_PDUSession_UpdateSMContext required service operation. When the N3 tunnel between the PGW-U/UPF 512 and the N3IWF 506 is established the PGW-U/UPF 512 may provide any buffered downlink data to the UE 502.

In certain embodiments, in a fourteenth communication 552 from the PGW-C/SMF 514 to the AMF 508, the PGW-C/SMF 514 may send a Nsmf_PDUSession_UpdateSMContext response to the AMF 508. In some embodiments, in response to the timer in the AMF 508 expiring, the AMF 508 may release 554 any PDU sessions that were not moved to non-3GPP access.

Figure 6:
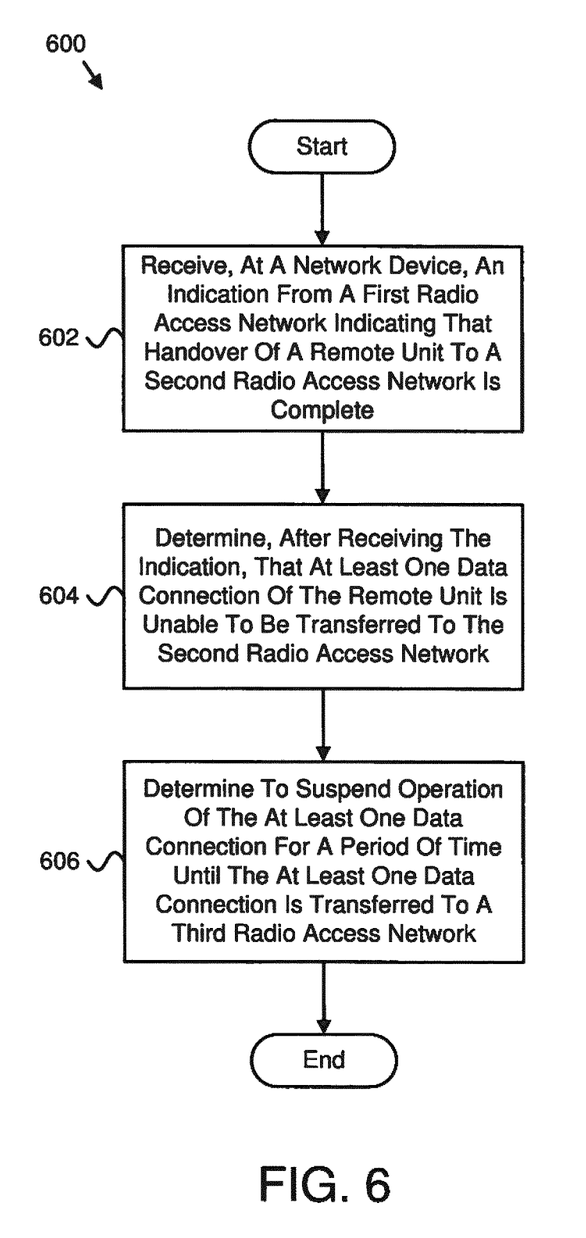
FIG. 6 is a schematic flow chart diagram illustrating one embodiment of a method for transferring a data connection to a radio access network.

FIG. 6 is a schematic flow chart diagram illustrating one embodiment of a method 600 for transferring a data connection to a radio access network. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602, at a network device, an indication from a first radio access network indicating that handover of a remote unit to a second radio access network is complete. In various embodiments, the method 600 includes determining 604, after receiving the indication, that at least one data connection of the remote unit is unable to be transferred to the second radio access network. In certain embodiments, the method 600 includes determining 606 to suspend operation of the at least one data connection for a period of time until the at least one data connection is transferred to a third radio access network.

Figure 7:
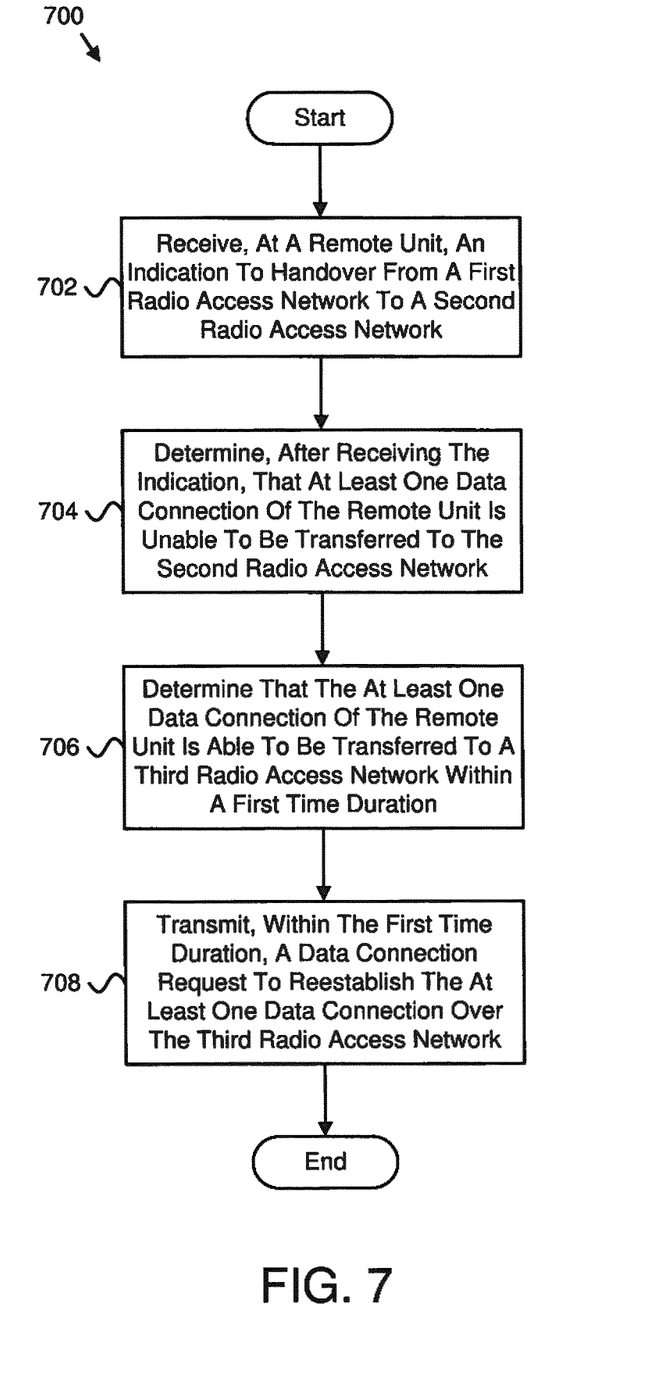
FIG. 7 is a schematic flow chart diagram illustrating another embodiment of a method for transferring a data connection to a radio access network.

FIG. 7 is a schematic flow chart diagram illustrating one embodiment of a method 700 for transferring a data connection to a radio access network. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702, at a remote unit 102, an indication to handover from a first radio access network to a second radio access network. In certain embodiments, the method 700 includes determining 704, after receiving the indication, that at least one data connection of the remote unit 102 is unable to be transferred to the second radio access network. In some embodiments, the method 700 includes determining 706 that the at least one data connection of the remote unit 102 is able to be transferred to a third radio access network within a first time duration. In various embodiments, the method 700 includes transmitting 708, within the first time duration, a data connection request to reestablish the at least one data connection over the third radio access network.

In one embodiment, the determining that the at least one data connection of the remote unit 102 is able to be transferred to the third radio access network includes evaluating, via the remote unit 102, a policy, wherein the policy indicates types of radio access networks allowed for each data connection. In certain embodiments, the policy is a user equipment route selection policy that has been provided to the remote unit 102 or pre-configured in the remote unit 102.

In some embodiments, the transmitting the data connection request to reestablish the at least one data connection includes, in response to the remote unit 102 being registered via the third radio access network, sending, via the remote unit 102, a protocol data unit session establishment request via the third radio access network. In various embodiments, the transmitting the data connection request to reestablish the at least one data connection includes, in response to the remote unit 102 not being registered via the third radio access network, connecting, via the remote unit 102, to the third radio access network and sending a registration request.

In one embodiment, the remote unit 102 is configured to support communication in the first radio access network, the second radio access network, and the third radio access network. In certain embodiments, the first radio access network supports connectivity to a first radio access type, the second radio access network supports connectivity to a second radio access type different from the first radio access type, and the third radio access network supports connectivity to a third radio access type different from the first radio access type and different from the second radio access type.

In some embodiments, the at least one data connection includes multiple data connections. In various embodiments, the at least one data connection includes, a protocol data unit session. In one embodiment, the third radio access network includes a non-third generation partnership project radio network. In certain embodiments, the third radio access network includes a wireless local area network.

In some embodiments, determining that the at least one data connection of the remote unit 102 is unable to be transferred to the second radio access network includes receiving information indicating that the at least one data connection does not have a data connection identifier for the second radio access network. In various embodiments, receiving the information indicating that the at least one data connection does not have the data connection identifier for the second radio access network includes receiving the information from an access and mobility function.

In one embodiment, the data connection identifier includes an evolved packet system bearer identifier. In certain embodiments, determining that the at least one data connection of the remote unit 102 is unable to be transferred to the second radio access network includes receiving information indicating that only voice bearers are to be handed over to the second radio access network. In some embodiments, receiving the information indicating that only voice bearers are to be handed over to the second radio access network includes receiving the information from an access and mobility function.

In various embodiments, a method comprises: receiving, at a remote unit, an indication to handover from a first radio access network to a second radio access network; determining, after receiving the indication, that at least one data connection of the remote unit is unable to be transferred to the second radio access network; determining that the at least one data connection of the remote unit is able to be transferred to a third radio access network within a first time duration; and transmitting, within the first time duration, a data connection request to reestablish the at least one data connection over the third radio access network.

In one embodiment, the determining that the at least one data connection of the remote unit is able to be transferred to the third radio access network comprises evaluating, via the remote unit, a policy, wherein the policy indicates types of radio access networks allowed for each data connection.

In some embodiments, the policy is a user equipment route selection policy that has been provided to the remote unit or pre-configured in the remote unit.

In certain embodiments, the transmitting the data connection request to reestablish the at least one data connection comprises, in response to the remote unit being registered via the third radio access network, sending, via the remote unit, a protocol data unit session establishment request via the third radio access network.

In various embodiments, the transmitting the data connection request to reestablish the at least one data connection comprises, in response to the remote unit not being registered via the third radio access network, connecting, via the remote unit, to the third radio access network and sending a registration request.

In one embodiment, the remote unit is configured to support communication in the first radio access network, the second radio access network, and the third radio access network.

In some embodiments, the first radio access network supports connectivity to a first radio access type, the second radio access network supports connectivity to a second radio access type different from the first radio access type, and the third radio access network supports connectivity to a third radio access type different from the first radio access type and different from the second radio access type.

In certain embodiments, the at least one data connection comprises a plurality of data connections.

In various embodiments, the at least one data connection comprises a protocol data unit session.

In one embodiment, the third radio access network comprises a non-third generation partnership project radio network.

In some embodiments, the third radio access network comprises a wireless local area network.

In certain embodiments, determining that the at least one data connection of the remote unit is unable to be transferred to the second radio access network comprises receiving information indicating that the at least one data connection does not have a data connection identifier for the second radio access network.

In various embodiments, receiving the information indicating that the at least one data connection does not have the data connection identifier for the second radio access network comprises receiving the information from an access and mobility function.

In one embodiment, the data connection identifier comprises an evolved packet system bearer identifier.

In some embodiments, determining that the at least one data connection of the remote unit is unable to be transferred to the second radio access network comprises receiving information indicating that only voice bearers are to be handed over to the second radio access network.

In certain embodiments, receiving the information indicating that only voice bearers are to be handed over to the second radio access network comprises receiving the information from an access and mobility function.

In various embodiments, an apparatus comprises: a receiver that receives an indication to handover from a first radio access network to a second radio access network; a processor that: determines, after receiving the indication, that at least one data connection of the apparatus is unable to be transferred to the second radio access network; and determines that the at least one data connection of the apparatus is able to be transferred to a third radio access network within a first time duration; and a transmitter that transmits, within the first time duration, a data connection request to reestablish the at least one data connection over the third radio access network.

In one embodiment, the processor determining that the at least one data connection of the remote unit is able to be transferred to the third radio access network comprises the processor evaluating, via the apparatus, a policy, wherein the policy indicates types of radio access networks allowed for each data connection.

In some embodiments, the policy is a user equipment route selection policy that has been provided to the apparatus or pre-configured in the apparatus.

In certain embodiments, the transmitter transmitting the data connection request to reestablish the at least one data connection comprises, in response to the apparatus being registered via the third radio access network, the transmitter sending, via the apparatus, a protocol data unit session establishment request via the third radio access network.

In various embodiments, the transmitter transmitting the data connection request to reestablish the at least one data connection comprises, in response to the apparatus not being registered via the third radio access network, the apparatus connecting to the third radio access network and sending a registration request.

In one embodiment, the apparatus is configured to support communication in the first radio access network, the second radio access network, and the third radio access network.

In some embodiments, the first radio access network supports connectivity to a first radio access type, the second radio access network supports connectivity to a second radio access type different from the first radio access type, and the third radio access network supports connectivity to a third radio access type different from the first radio access type and different from the second radio access type.

In certain embodiments, the at least one data connection comprises a plurality of data connections.

In various embodiments, the at least one data connection comprises a protocol data unit session.

In one embodiment, the third radio access network comprises a non-third generation partnership project radio network.

In some embodiments, the third radio access network comprises a wireless local area network.

In certain embodiments, the processor determining that the at least one data connection of the remote unit is unable to be transferred to the second radio access network comprises the receiver receiving information indicating that the at least one data connection does not have a data connection identifier for the second radio access network.

In various embodiments, the receiver receiving the information indicating that the at least one data connection does not have the data connection identifier for the second radio access network comprises the receiver receiving the information from an access and mobility function.

In one embodiment, the data connection identifier comprises an evolved packet system bearer identifier.

In some embodiments, the processor determining that the at least one data connection of the remote unit is unable to be transferred to the second radio access network comprises the receiver receiving information indicating that only voice bearers are to be handed over to the second radio access network.

In certain embodiments, the receiver receiving the information indicating that only voice bearers are to be handed over to the second radio access network comprises the receiver receiving the information from an access and mobility function.

Embodiments may be practiced in other specific forms. The described embodiments are to be considered in all respects only as illustrative and not restrictive. The scope of The invention is, therefore, indicated by the appended claims rather than by the foregoing description. All changes which come within the meaning and range of equivalency of the claims are to be embraced within their scope.

The invention claimed is:

1. A method comprising:
receiving, at a remote unit, an indication to handover from a first radio access network to a second radio access network;
determining, after receiving the indication, that at least one data connection of the remote unit is unable to be transferred to the second radio access network, wherein determining that the at least one data connection of the remote unit is unable to be transferred to the second radio access network comprises:
receiving information indicating that the at least one data connection does not have a data connection identifier for the second radio access network; or
receiving information indicating that only voice bearers are to be handed over to the second radio access network; or
receiving information indicating that the at least one data connection does not have a data connection identifier for the second radio access network and information indicating that only voice bearers are to be handed over to the second radio access network;
determining that the at least one data connection of the remote unit is able to be transferred to a third radio access network within a first time duration; and
transmitting, within the first time duration, a data connection request to reestablish the at least one data connection over the third radio access network.

2. The method of claim 1, wherein the determining that the at least one data connection of the remote unit is able to be transferred to the third radio access network comprises evaluating, via the remote unit, a policy, wherein the policy indicates types of radio access networks allowed for each data connection.

3. The method of claim 2, wherein the policy is a user equipment route selection policy that has been provided to the remote unit or pre-configured in the remote unit.

4. The method of claim 1, wherein the transmitting the data connection request to reestablish the at least one data connection comprises, in response to the remote unit being registered via the third radio access network, sending, via the remote unit, a protocol data unit session establishment request via the third radio access network.

5. The method of claim 1, wherein the transmitting the data connection request to reestablish the at least one data connection comprises, in response to the remote unit not being registered via the third radio access network, connecting, via the remote unit, to the third radio access network and sending a registration request.

6. The method of claim 1, wherein the remote unit is configured to support communication in the first radio access network, the second radio access network, and the third radio access network.

7. The method of claim 1, wherein the first radio access network supports connectivity to a first radio access type, the second radio access network supports connectivity to a second radio access type different from the first radio access type, and the third radio access network supports connectivity to a third radio access type different from the first radio access type and different from the second radio access type.

8. The method of claim 1, wherein the at least one data connection comprises a plurality of data connections.

9. The method of claim 1, wherein the at least one data connection comprises a protocol data unit session.

10. The method of claim 1, wherein the third radio access network comprises a non-third generation partnership project radio network.

11. The method of claim 1, wherein the third radio access network comprises a wireless local area network.

12. The method of claim 1, wherein receiving the information indicating that the at least one data connection does not have the data connection identifier for the second radio access network comprises receiving the information from an access and mobility function.

13. The method of claim 1, wherein the data connection identifier comprises an evolved packet system bearer identifier.

14. The method of claim 1, wherein receiving the information indicating that only voice bearers are to be handed over to the second radio access network comprises receiving the information from an access and mobility function.

15. An apparatus comprising:
a receiver that receives an indication to handover from a first radio access network to a second radio access network;
a processor that:
determines, after receiving the indication, that at least one data connection of the apparatus is unable to be transferred to the second radio access network, wherein determining that the at least one data connection of the apparatus is unable to be transferred to the second radio access network comprises:
receiving information indicating that the at least one data connection does not have a data connection identifier for the second radio access network; or
receiving information indicating that only voice bearers are to be handed over to the second radio access network; or
receiving information indicating that the at least one data connection does not have a data connection identifier for the second radio access network and information indicating that only voice bearers are to be handed over to the second radio access network; and
determines that the at least one data connection of the apparatus is able to be transferred to a third radio access network within a first time duration; and
a transmitter that transmits, within the first time duration, a data connection request to reestablish the at least one data connection over the third radio access network.

16. The apparatus of claim 15, wherein the processor that determines that the at least one data connection of the apparatus is able to be transferred to the third radio access network, evaluates a policy, wherein the policy indicates types of radio access networks allowed for each data connection.

17. The apparatus of claim 16, wherein the policy is a user equipment route selection policy that has been provided to the apparatus or pre-configured in the apparatus.

18. The apparatus of claim 15, wherein the transmitter that transmits the data connection request to reestablish the at least one data connection, in response to the apparatus being registered via the third radio access network, sends a protocol data unit session establishment request via the third radio access network.

* * * * *